Aug. 17, 1943.  J. P. SPANG  2,327,224
POULTRY DRESSING MACHINE
Filed Aug. 5, 1941  2 Sheets-Sheet 2
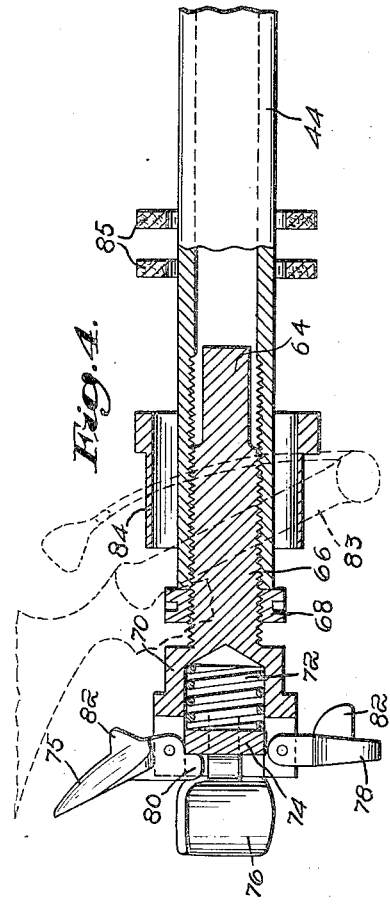
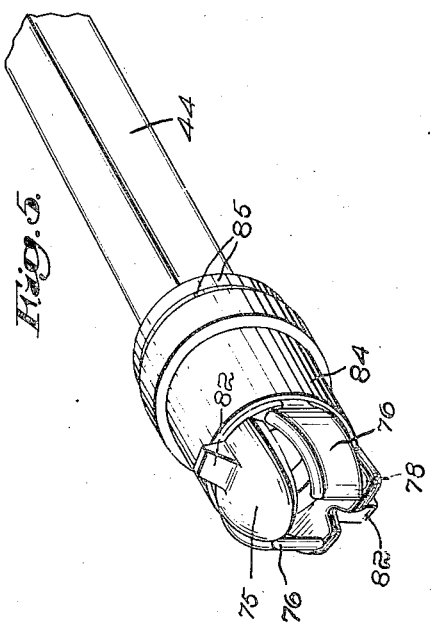
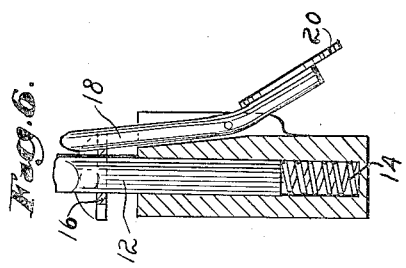
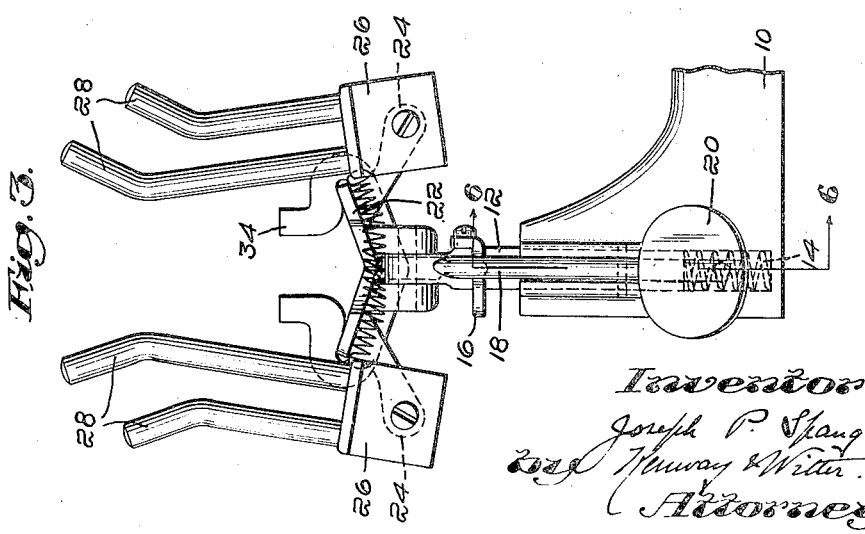

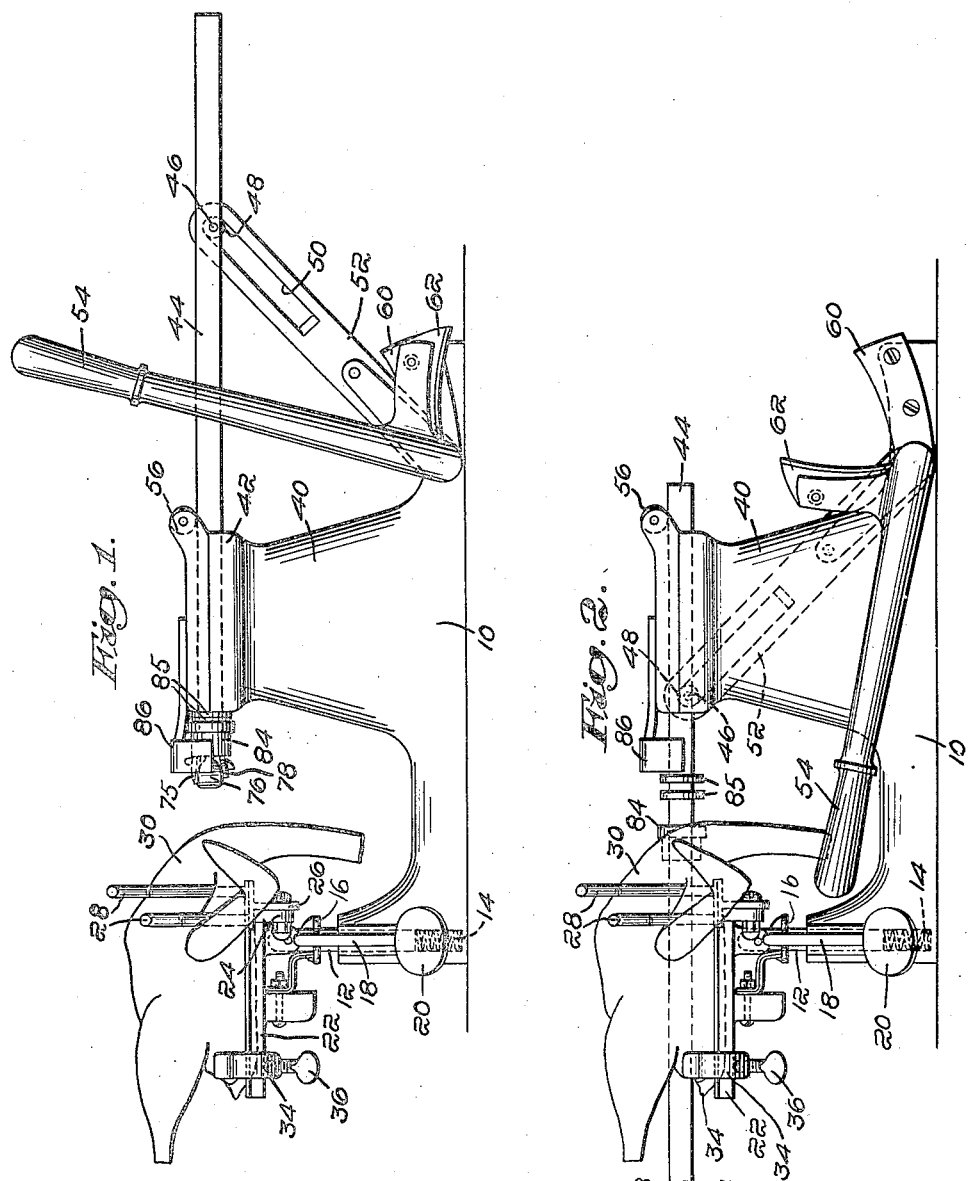

Patented Aug. 17, 1943

2,327,224

UNITED STATES PATENT OFFICE 2,327,224

POULTRY DRESSING MACHINE

Joseph P. Spang, Quincy, Mass., assignor to Cube Steak Machine Co., Boston, Mass., a corporation of Massachusetts Application August 5, 1941, Serial No. 405,499

10 Claims. (Cl. 17—11)

My invention relates to machines or apparatus for cleaning or eviscerating poultry, game, and other food animals. In one aspect my invention consists in an improved machine of the type disclosed in United States Letters Patent No. 2,189,484 granted February 6, 1940, to Alcibiade A. Brodeur and reissued as Reissue 21,983, December 23, 1941. In another aspect it consists in improvements of more general application whereby a faster, more accurate and more automatic machine may be produced than has been heretofore available.

My invention will be herein described in its application to an eviscerating machine for poultry although it is not limited to that or to any specific field of use. The essential elements of such a machine comprise a support for holding the bird to be cleaned and a shaft arranged to be driven through the bird and carrying fingers on one end which are opened after their introduction into the interior of the bird and engage its entrails. One object of my invention is to provide means, automatically operated upon contact with the bird, for causing opening of the entrail-engaging fingers. The speed of operation of previous machines has been limited due to the necessity of stopping their operation while the fingers were being opened and uniform results have not been secured because of the difficulty of making sure that the fingers were opened just at the right time in the cycle of operations or at the proper place for their intended function.

Another object of my invention is to supply shears combined with and operated by the eviscerating machine in order to reduce the time necessary in dressing a bird and to produce a compact easily operated machine.

There are several novel features incorporated in the machine of my invention, chief among them being an easily removable head containing the entrail-engaging fingers, self-spacing clamps, powerful and simple driving means, and an easily manipulated mechanism for controlling the position of the support upon which the bird is held.

The machine of my invention, besides being capable of rapid and efficient operation, may be easily disassembled for cleaning and may be built more economically than machines heretofore in use.

These and other objects and features of my invention will be more readily understood and appreciated from the following detailed description of a preferred embodiment thereof, selected for purposes of illustration and shown in the accompanying drawings, in which:

Fig. 1 is a view in side elevation of a machine constructed according to my invention, in readiness for an eviscerating operation, Fig. 2 is a similar view in side elevation after the machine has completed an operation, Fig. 3 is a view in end elevation of the platform and clamps used to support a bird, Fig. 4 is a view in cross-section longitudinally through the operating head of the machine, Fig. 5 is a view in perspective of the operating head of the machine, and Fig. 6 is a view in cross section taken along the line 6—6 of Fig. 3.

The drawings show, by way of example, an elongated narrow base 10 vertically bored to receive a shaft 12 which floats on a compression spring 14 and extends upwardly from the base. Screwed to the shaft 12 is a ring 16 provided with spaced peripheral slots which receive a locking pin 18 pivotally mounted in the base 10 and provided on its lower end with an inclined plate or button 20. Pressure on the plate 20 swings the pin 18 outwardly and frees it from a slot in the ring 16. Then the shaft 12 can be rotated. When a new position has been reached, the pin 18 is permitted to fall back into a slot in the ring 16 and again lock the shaft against rotation.

Secured to the upper end of the vertical shaft 12 is a dished support 22 suitably dimensioned to receive the bird to be eviscerated. Lugs 24 on the support 22 support a pair of pivotally mounted plates 26 from which four pins 28 extend upwardly. As shown in Figs. 1 and 2 the wings of a bird 30, or forelegs of an animal, may be wrapped around the pins 28, the forward rods being engaged between the body and upper portions of the wings, while the rear pins are disposed in the crooks of the second joints. These pins 28 serve to hold the bird 30 against forward or rearward movement on the platform provided by the support 22. A spring 32 urges the two sets of pins together against the sides of the bird, their spacing conforming to the breadth of the particular bird to be eviscerated. A forked stop member 34 fits upon the rear end of the support 22 and may be clamped in position by means of a set screw 36.

Extending upwardly from the center of the base 10 is a pillar 40, to the top of which is secured a head 42 having a long horizontal bore receiving a square hollow shaft 44. One side of the head 42 is slotted and a pin 46 projecting from one side of the shaft 44 may slide in the slot. The pin 46 carries a roller 48 which projects into a slot 50 formed in a lever 52 journaled in the base 10. Integrally mounted with the lever 52 is a handle 54, and it will be evident that when the handle is rocked, the lever 52 drives the shaft 44 back and forth through the head 42. A roller 56 is carried by the head 42 and bears against the shaft 44 to compensate for the weight of the shaft when it is extended to the position shown in Fig. 2.

A stationary knife blade 60 is secured to the base 10 adjacent the handle 54, and a similar blade 62 is secured to the handle. When the handle is swung rearwardly the blades 60 and 62 cooperate as shears and can conveniently be used to cut off the head and feet of a bird.

The eviscerating head is carried on one end of the horizontal shaft 44 and includes a short shaft 64 having a threaded body 66 adjustably received in the threaded hollow end of the shaft 44 and provided with a lock nut 68. The position of the shaft 64 may be adjusted by screwing it into or out of the end of the shaft 44 and it may be clamped in adjusted position by setting the lock nut 68 against the end of the shaft 44. On the outer end of the shaft 64 an enlarged hollow head 70 is provided in which is contained a spring 72 and a disk 74. Pivotally mounted in the head 70 are four fingers, an upper finger 75, side fingers 76, and a lower finger 78. The upper finger 75 has an integral lug 80 at its lower end, which bears against the outer face of the disk 74. The side fingers 76 are similarly provided with lugs, but the bottom finger has no contact with the disk 74. The top and side fingers are arranged so that they can be opened to the position shown in Figs. 2 and 4, while the bottom finger 78 hangs freely. The outer faces of the top finger 75 and the bottom finger 78 are provided with lugs 82 for a purpose later to be explained. The forward outer faces of all the fingers are carefully rounded. Sliding freely on the shaft 44 is a shouldered ring 84 dimensioned to fit over the head 70. When the ring 84 is forced over the head 70, it causes the fingers to clench and assume the position shown in Fig. 5 in which the rounded fingers present a smooth hemispherical end for the head 70. Two fibre rings 85 back up the ring 84 and reduce shock and noise when the machine is operated. Secured to the head 42 is an overhanging forwardly projecting stop 86 having a semi-circular end shaped to meet the top finger 75 and the side fingers 76 when the shaft 44 is retracted.

As the handle 54 is turned to the right in Figs. 1 and 2 the shaft 44 moves to the right bringing the pivotally mounted fingers against the stop 86; further movement of the shaft 44 causes the fingers to begin to clench and to pass under the stop 86, and still further movement of the shaft 44 brings the ring 84 against the head 42 and forces it over the head 70 to completely clench the fingers and hold them in this initial position.

When the shaft 44 moves to the left the clenched fingers move into an aperture formed in the breast of the bird 30. The ring 84, however, is not small enough to enter the bird and the breast bones 83 engage the shoulder on the ring, preventing further travel thereof. The ring 84 is thus held at rest and forced away from the head 70, releasing the fingers and permitting the spring 72 to open or spread the fingers, which are pushed on through the bird until the entrails are pushed out at the rear end.

In using the machine of my invention a bird is first decapitated by the blades 60 and 62, the feet are similarly cut off, and the bird is mounted on the support 22, the wings being caught in the pins 28. The stop 34 may be used to hold the bird more firmly and is particularly useful when a frozen bird is to be dressed. The plate 20 is depressed and the support swung until the bird faces the operator. The crop is then removed by hand and a suitable aperture made in the breast of the bird for the entry of the fingers. Then the bird is swung on the platform until it faces away from the operator, in which position the rear end of the bird is opened to permit the fingers on the shaft 44 to emerge and come all the way through. The handle 54 is swung rearwardly or to the right carrying the eviscerating head into its initial position as shown in Fig. 1. In this movement the stop 86 acts, as already explained, to close or contract the four fingers against the compression of the spring actuator 72 and to move the ring 84 forwardly with respect to the head so as to latch the fingers in cocked position under spring tension.

Finally the bird is swung about until it faces the oncoming fingers, the handle 54 is swung forwardly or to the left to introduce the clenched fingers into the bird, the ring 84 is forced from the head 70, tripping the fingers so that they may open under actuation of the spring 72 and the open fingers sweep through the interior of the bird, removing all the viscera or entrails. The bird's gizzard, which is centrally located and sure to be engaged by the fingers, is secured to the other viscera, and consequently the entrails are entirely removed.

The bottom finger 78 hangs down freely and drags along the interior of the bird 30 sweeping before it all that it encounters. The lugs 82 on the fingers 75 and 78 ensure opening of the fingers, since these lugs are in a position to be engaged by the flesh of the bird as the fingers make their entrance.

When the entrails have been pushed out of the rear end of the bird, the handle is returned to its initial position, automatically cocking the fingers again in preparation for another operation.

It should be noted that the eviscerating is completely accomplished in one smooth continuous movement of the handle; there is no lost motion, and the operator of the machine need not change the position of his hands throughout the operation. In the machine of my invention the eviscerating operation is effective by relative movement of the support for the bird and the eviscerating head, the eviscerating head being herein shown as movable on the base and relative to the support which latter is shown as fixed to the base.

Having now described and illustrated my invention, what I claim as new and desire to secure by Letters Patent of the United States is:

1. A machine for cleaning poultry, which comprises, a support for a bird and a shaft mounted for relative movement longitudinally of the shaft, a plurality of fingers pivotally mounted at the end of said shaft and initially held in closed position, and means engageable with the bird on said support for releasing said fingers.

2. A machine for cleaning poultry, which comprises a support for a bird and a shaft mounted for relative movement to project the shaft through a bird on said support, entrail-engaging means secured to the end of said shaft and initially maintained in inoperative position, and means on the shaft operated by engagement with a bird on said support for causing said entrail-engaging means to assume operative position.

3. A machine for eviscerating poultry, which comprises a support for a bird, a carrier member, entrail-engaging fingers pivotally mounted thereon, means for forcing said fingers through a bird on said support, and means for engaging a bird on said support and thereby causing said fingers to expand upon reaching a predetermined distance into the interior of said bird.

4. A machine for preparing poultry, which comprises, a base, a head secured to said base, a shaft mounted for reciprocation in said head, a handle journaled in the base and connected to said shaft, a blade secured to the handle, a cooperating stationary blade secured to the base, and eviscerating means secured to said shaft, whereby the handle operates the blade as well as the eviscerating means.

5. A machine for preparing poultry, which comprises a base, a support for a bird secured to said base, a head secured to said base, a shaft mounted in said head for reciprocation through an animal on said support, a lever journaled in said base and connected to said shaft, a handle pivotally mounted in the base and connected to the lever, a stationary shear blade secured to the base, and a cooperating shear blade connected to said handle.

6. In a machine for cleaning poultry, a shaft mounted for reciprocation through a bird, eviscerating means comprising a hollow head removably mounted on said shaft, a compression spring disposed within said hollow head, a plurality of fingers pivotally mounted at the end of said head, means associated with said spring for urging said fingers outwardly, and a ring mounted to slide over said head and close the fingers.

7. A machine for eviscerating poultry, which comprises a base, a head secured to said base, a shaft mounted for reciprocation in said head, a plurality of fingers secured to the end of the shaft, means urging the fingers outwardly, and a stop secured to the head and lying in the path of said fingers, whereby reciprocation of the shaft will draw the fingers past the stop and thereby close them.

8. A machine for cleaning poultry, which comprises a support for a bird, a carrier member, entrail-engaging fingers pivotally mounted on said carrier member, means for causing relative movement of the support and the carrier member to introduce the fingers into the bird, and means for engaging a bird on said support and thereby causing said fingers to expand upon reaching a pre-determined distance into said bird.

9. A machine for cleaning poultry, which includes in its structure a support for a bird and a shaft mounted for relative movement to carry the end of the shaft through the bird from one end to the other, a group of expansible spring operated fingers mounted on the end of the shaft and held initially in contracted position, and releasing means carried by the shaft and movable thereon by engagement with the bird and without interrupting the relative movement of the shaft and bird for automatically causing the fingers to expand within the bird.

10. A machine for cleaning poultry, which includes a base having thereon a support for a bird and an eviscerating head mounted for relative movement to carry the head through the bird from one end to the other, a plurality of fingers movably mounted on the head, spring means tending at all times to expand the fingers, operating mechanism for effecting said relative movement of the head and support, means for forcibly contracting the fingers upon separating movement of the head and support, and a device for latching the fingers in contracted position, movement of the latching device relative to the head during approaching relative movement of the head and support being adapted to release the fingers for expanding movement.

JOSEPH P. SPANG.